(12) United States Patent
Workman et al.

(10) Patent No.: US 10,028,452 B2
(45) Date of Patent: Jul. 24, 2018

(54) HORTICULTURAL MONITORING SYSTEM

(71) Applicant: BeeSprout LLC, Chandler, AZ (US)

(72) Inventors: Christopher Workman, Mountain View, CA (US); Maria Bocanegra, Mountain View, CA (US)

(73) Assignee: BEESPROUT, LLC, Chandler, AZ (US)

( * ) Notice: Subject to any disclaimer, the term of this patent is extended or adjusted under 35 U.S.C. 154(b) by 0 days.

(21) Appl. No.: 15/476,287

(22) Filed: Mar. 31, 2017

(65) Prior Publication Data

US 2017/0286772 A1    Oct. 5, 2017

Related U.S. Application Data

(60) Provisional application No. 62/318,110, filed on Apr. 4, 2016.

(51) Int. Cl.
*G06K 9/62* (2006.01)
*A01G 22/00* (2018.01)
*H04L 29/08* (2006.01)
*G08C 17/02* (2006.01)
*A01G 25/16* (2006.01)
*G06K 9/00* (2006.01)

(52) U.S. Cl.
CPC ............ *A01G 22/00* (2018.02); *A01G 25/16* (2013.01); *A01G 25/167* (2013.01); *G06K 9/00664* (2013.01); *G08C 17/02* (2013.01); *H04L 67/10* (2013.01); *H04L 67/26* (2013.01)

(58) Field of Classification Search
CPC ............ G06K 9/00657; G06K 2209/17; G06T 2207/30188
See application file for complete search history.

(56) References Cited

U.S. PATENT DOCUMENTS

| 2012/0046837 | A1  | 2/2012  | Anderson |
| 2012/0123817 | A1  | 5/2012  | Hohenberger et al. |
| 2015/0131867 | A1* | 5/2015  | Lin ........................ G06T 7/0014 382/110 |
| 2016/0371830 | A1* | 12/2016 | Barrasso ............... G06T 7/0004 |

OTHER PUBLICATIONS

Nikolaus Correll et al., "Indoor Robot Gardening: Design and Implementation", MIT Open Access Articles, Intelligent Service Robotics 3.4, 2010, 16 pages total.*
International Search Report and Written Opinion for International Application No. PCT/US2017/025715 dated Jun. 30, 2017.

* cited by examiner

*Primary Examiner* — Brian Werner
(74) *Attorney, Agent, or Firm* — Nixon Peabody LLP; Eduardo J. Quinones (57) ABSTRACT

An example plant monitoring system can include sensors connected to a horticultural monitor. The sensors can measure the soil, the environment, individual plant characteristics, etc. At least one horticultural monitor can send sensor data to a local beacon. The local beacon can then receive the data and send it to cloud resources which can process the data. The cloud resources can determine the health of the plant and monitor its development. A user can track this health and development using an interaction device.

24 Claims, 9 Drawing Sheets

HORTICULTURAL MONITORING SYSTEM

CROSS-REFERENCE TO RELATED APPLICATIONS

This application claims priority to and the benefit of U.S. Provisional Patent Application No. 62/318,110, entitled "PLANT MONITORING SYSTEM" and filed on Apr. 4, 2016, the contents of which are hereby incorporated by reference in their entirety.

FIELD OF THE INVENTION

This disclosure relates to the cultivation and monitoring of plants.

BACKGROUND

Traditionally, growing plants and gardening has required close supervision of the plants and expert knowledge. For this reason, many people either lack the time to try gardening or get frustrated by their lack of knowledge. Furthermore, when gardeners are away (e.g., on vacation), they are sometimes required to ask neighbors to care for their plants. What is needed is an improved system for the monitoring and care of plants.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example plant monitoring system can include sensors connected to a horticultural monitor. The sensors can measure one or more of the soil, the environment, individual plant characteristics, water level, humidity, sunlight, temperature, wind speed and direction, time, seasonal data, etc. A monitor (e.g., a photo or video monitor) can also be included as part of the plan monitoring system. At least one horticultural monitor can send sensor data to a local beacon. The local beacon can then receive the data and send it to cloud resources which can process the data. The cloud resources can determine the health of the plant and monitor its development based at least in part on the data received. A user can track the health and development of plants using an interaction device and can also track progress and can control at least some components remotely.

In a first exemplary embodiment, there is provided a computer-implemented method. The method includes capturing data for a monitored plant via one or more sensors, comparing, via a processor, the data for the monitored plant with data associated with other plants of a same species as the monitored plant and at one or more plant life stages to yield a comparison, and determining, based on the comparison and via a life stage determination algorithm, a one of the plant life stages associated with the monitored plant.

The method can include, when the determining indicates that the one of the plant life stages for the monitored plant is a target plant life stage, sending a push notification to a user device, the push notification indicating that the plant has reached the target plant life stage. The method can also include, when the determining indicates that the one of the plant life stages for the monitored plant is a target plant life stage, sending a push notification to a harvester device, the push notification comprising instructions for the harvester device to harvest at least a portion of the monitored plant.

In the method, the data for the monitored plant can include image data. The method can then include determining at least one of a species of the monitored plant and the one of the plant life stages for the monitored plant based on the image data.

When the monitored plant is a fruit bearing plant, the method can include estimating, based on the data for the monitored plant, a quantity of a type of fruit that is available for harvesting from the plant.

The method can include transmitting, over a wireless interface, the data for the monitored plant from a horticultural monitor to a local beacon, and transmitting the data for the monitored plant from the local beacon to cloud resources via a wide area network, wherein the comparing is performed by the cloud resources.

In the method, at least one of the plant life stages comprises a plant life stage associated with a suboptimal health condition. The method can then include, when the determining indicates that the one of the plant life stages for the monitored plant is associated with the suboptimal health condition, sending a push notification to a user device, the push notification indicating that a health of the monitored plant is suboptimal.

The method can include determining, using the data and a health determination algorithm, a cause for the health of the monitor plant to be suboptimal. The method can then include, based on the cause, providing one or more instructions to the user device for enhancing the health of the monitored plant. The method can also include, based on the cause, determining a remedial measure for enhancing the health of the monitored plant that does not require human intervention and implementing the remedial measure. The remedial measure can include activating at least one of an irrigation system or a nutrient delivery system.

In the method, the sensors include at least one of a soil sensor, a camera, or a water sensor.

In a second exemplary embodiment, a system is provided that includes a processing system having at least one processor and a computer-readable medium and one or more horticultural monitors communicatively coupled to the processing system, where each of the horticultural monitors comprising one or more sensors for monitoring at least one plant and configured for recording data from the sensors and transmitting the data to the processing system. The computer-readable medium includes instructions for causing the at least one processor to perform steps. The steps include obtaining the data for the monitored plant, comparing the data for the monitored plant with data associated with other plants of a same species as the monitored plant and at one or more plant life stages to yield a comparison, and determining, based on the comparison and via a life stage determination algorithm, a one of the plant life stages associated with the monitored plant.

The method can include, when the determining indicates that the one of the plant life stages for the monitored plant is a target plant life stage, sending a push notification to a user device, the push notification indicating that the plant has reached the target plant life stage. The method can also include, when the determining indicates that the one of the plant life stages for the monitored plant is a target plant life stage, sending a push notification to a harvester device, the push notification comprising instructions for the harvester device to harvest at least a portion of the monitored plant.

In the system, the data for the monitored plant can include image data. The steps can then include determining at least one of a species of the monitored plant and the one of the plant life stages for the monitored plant based on the image data.

When the monitored plant is a fruit bearing plant, the steps can include estimating, based on the data for the monitored plant, a quantity of a type of fruit that is available for harvesting from the plant.

The steps can include transmitting, over a wireless interface, the data for the monitored plant from a horticultural monitor to a local beacon, and transmitting the data for the monitored plant from the local beacon to cloud resources via a wide area network, wherein the comparing is performed by the cloud resources.

When at least one of the plant life stages includes a plant life stage associated with a suboptimal health condition, the steps can then include, when the determining indicates that the one of the plant life stages for the monitored plant is associated with the suboptimal health condition, sending a push notification to a user device, the push notification indicating that a health of the monitored plant is suboptimal.

The steps can include determining, using the data and a health determination algorithm, a cause for the health of the monitor plant to be suboptimal. The steps can then include, based on the cause, providing one or more instructions to the user device for enhancing the health of the monitored plant. The steps can also include, based on the cause, determining a remedial measure for enhancing the health of the monitored plant that does not require human intervention and implementing the remedial measure. The remedial measure can include activating at least one of an irrigation system or a nutrient delivery system.

In the system, the sensors include at least one of a soil sensor, a camera, or a water sensor.

In the system, the processing system can include a local beacon and remote cloud resources, with the local beacon being communicatively coupled to one or more horticultural monitors and one or more local resources, and with the remote cloud resources being communicatively coupled to the local beacon, wherein the comparing and the determining is performed by the remote cloud resources.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a plant monitoring system.

Figure 1:
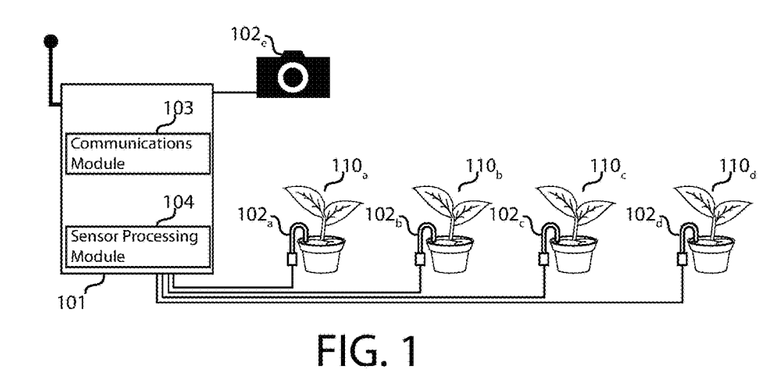
FIG. 1 shows an example system configuration according to some embodiments.

FIG. 1 shows an example system configuration according to various embodiments. Horticultural monitor 101 can monitor one or more plants $110_a$-$110_d$ (collectively, "plants 110") using one or more sensors $102_a$-$102_e$. Horticultural monitor 101 can be a portable electronic device (e.g., a phone, tablet, or laptop), a general purpose computing device (e.g., a personal computer), or a special purpose device (e.g., a device that is purpose-built as horticultural monitor 101). Horticultural monitor 101 can have a processor, memory, one or more communication interfaces (e.g., for wireless or wired communications or any protocol known in the art), a power source, receivers for sensor wires, internal sensors (e.g., one or more of sensors $102_a$-$102_e$), a power supply for sensors, etc. Horticultural monitor 101 can be a low-power type such that it does not require an external power source or recharging. This can be accomplished by having an internal battery that lasts greater than a year or an environmental power harvesting module (e.g., a module for harvesting solar energy, wind energy, thermal energy, or other sources of environmental energy). Horticultural monitor 101 can have a physical restraint mechanism. For example, horticultural monitor 101 can have a stake for restraint in soil. Horticultural monitor 101 can have various other input and output capabilities. For example, horticultural monitor 101 can have a keyboard, mouse, motion sensor, microphone, camera, capacitive touch sensor, etc. Horticultural monitor 101 can have a display (e.g., LCD, LED, or electronic ink), light (e.g., LED or incandescent bulb), speaker, and/or other output device and/or connection to receive an output device. Horticultural monitor 101 can communicate (e.g., wirelessly or via a wire) with the sensors. Horticultural monitor can also communicate with other devices, whether via a direct connection (e.g., infrared, ad-hoc WiFi, Bluetooth, etc.) or via a network (e.g., a LAN or WAN such as the Internet). Horticultural monitor 101 can be weather resistant (e.g., against water or dust) and have a strong outer casing to prevent other environmental damage (e.g., from an animal).

In some embodiments, sensors are cameras. For example, sensor $102_e$, is shown as being a camera that is positioned above the plants $110_a$-$110_e$. The camera can be effective to detect various visible and/or invisible light spectra (e.g., infrared, red-green-blue, red, green, blue, x-ray, etc.). As such, the camera $102_e$ can be an infrared camera or a specialized camera which has the capability of detecting individual programmed spectra. The camera $102_e$ can be dynamically positioned by horticultural monitor 101. For example, horticultural monitor 101 can position sensor $102_e$ to observe plant $110_a$ and then position sensor $102_e$ to observe plant $102_b$. The camera $102_e$ can enable various physical filters to modify the image. For example, horticultural monitor 101 can instruct the camera $102_e$ to enable a red and blue filter to only allow green light to be recorded. In another example, horticultural monitor 101 can instruct the camera to enable a filter to only let infrared light pass. Polarizer filters can also be used for various purposes (e.g., to decrease glare or identify reflective elements such as moisture). The camera can detect depth data. Digital filters (e.g., low pass, high pass, de-noise, dust detection/removal, chromatic aberration correction, lens distortion correction, edge detection, and various color and tonal filters) can also be applied in-camera or in a separate system. The camera can produce various images of the same scene which can be analyzed to identify characteristics of a subject plant.

A sensor can be a capacitive soil moisture sensor. For example, the sensor can be a printed circuit board (PCB) with separated traces that change capacitance based on the water concentration surrounding the traces. A sensor as used herein can refer to at least one of the one or more sensors $102_a$-$102_e$. A sensor can be a humidity sensor. A sensor can be an ambient temperature sensor. A sensor can be a topical temperature sensor (e.g., to measure the soil temperature). A sensor can be a luminosity sensor (e.g., a photovoltaic sensor). A sensor can be an electrical conductivity sensor.

A sensor can be assigned one plant or part of a plant (e.g., on an individual leaf, branch, fruit, or the stem). A sensor can be assigned multiple plants or a region. For example, in a garden of 16 plants (4 rows by 4 columns), 4 sensors dispersed throughout the garden can monitor various regions. The environmental characteristics of an individual plant can be extrapolated from regional sensors. For example by using a distance-weighted average of surrounding sensors.

A sensor can provide raw (i.e., analog) values to horticultural monitor 101. A sensor can communicate to horticultural monitor 101 using digital signals. The communication to horticultural monitor 101 can be wireless (e.g., infrared, cellular, WiFi, other electromagnetic spectra, NFC, or magnetic fields) or wired. Any wireless protocol can be utilized for communication. Sensors can connect to horticultural monitor 101 in parallel, using a bus, or any other means as known in the art. In some embodiments, horticultural monitor 101 supplies power to one or more sensors.

Sensor processing module 104 can use the input values from sensors to generate data. In some embodiments this includes digitizing raw values (e.g., using an analog-to-digital converter) or otherwise converting the signal from sensors to more manageable values. Sensor processing module 104 can interpolate sensor values and assign them to individual plants. For example, sensor processing module can generate reports on individual plants 110 based on the corresponding sensors.

Communications module 103 can facilitate communication with external devices according to some embodiments. The module 103 can be a wireless model that communication with the external devices through any wireless protocol.

Horticultural monitor 101 can use ambient power sources (e.g., solar or wind) also for its power. Horticultural monitor 101 can generate power from a local irrigation system. Horticultural monitor 101 can have an internal battery. Horticultural monitor 10 can utilize high efficiency components and protocols in order to prolong its operating life on a single power cycle. For example, horticultural monitor 101 can put itself (e.g., the processor, memory, and other components) in a suspend state with a wakeup time. Thus, horticultural monitor 101 can periodically wake up to take measurements and transmit data followed by another suspend cycle.

Figure 2:
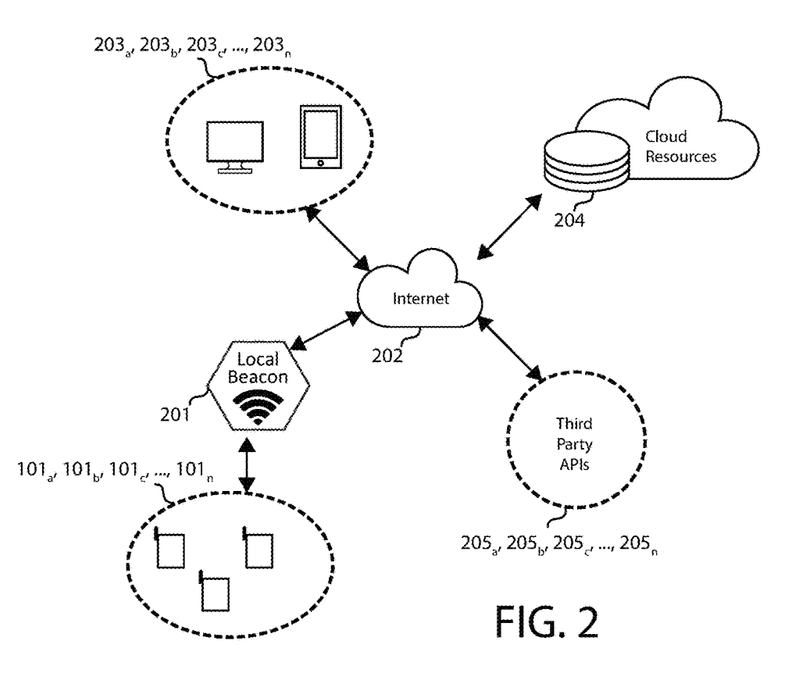
FIG. 2 shows a network topology according to some embodiments.

FIG. 2 shows a network topology according to some embodiments. Horticultural monitors $101_a$, $101_b$, $101_c$, . . . , $101_n$ can communicate with local beacon 201. Local beacon 201, Interaction (user) devices $203_a$, $203_b$, $203_c$, . . . , $203_n$ (collectively, "interaction device 203"), cloud resources 204, and third party APIs $205_a$, $205_b$, $205_c$, . . . , $205_n$ (collectively, "third party API 205") can interconnect via the Internet 202 or any other network.

Local beacon 201 can connect to horticultural monitor 101 via a wireless protocol. Because of possible power constraints, the communication between local beacon 201 and horticultural monitor 101 can utilize efficient protocols such as Bluetooth low energy and Zigbee. However, higher power protocols are also contemplated and can be sufficient. Local beacon 201 can be connected to a user's home router using WiFi, Ethernet, or other Internet protocols. Local beacon 201 can preprocess data from multiple horticultural monitors 101. Local beacon 201 can send horticultural monitor 101 data to interaction device 203, cloud resources 204, or third party APIs 205.

For example, a sensor can collect sensor data as described herein. This sensor data can describe one or more of the humidity, temperature, wind speed, air quality, soil composition, soil water saturation, soil conductivity, soil pH, soil water outflow, ambient luminosity, plant characteristics (height, temperature, conductivity, chlorophyll levels, etc.), pest detections, etc. The sensor data can also include camera data (e.g., visible, infrared data, or data associated with other spectra). The sensor data can also include status data regarding the status and identity of the individual sensors (e.g., power status, location, and serial number). Horticultural monitor 101 can then receive the sensor data and transmit the sensor data to local beacon 201. Before relaying the sensor data, horticultural monitor 101 can interpret or otherwise process some or all of the sensor data; this can include summarizing the sensor data. Local beacon 201 can then receive the sensor data and similarly interpret or otherwise process some or all of the received data. Local beacon 201 can then send the data to interaction device 203, cloud resources 204, or third party APIs 205.

Local beacon 201 can host a web server or application program interface ("API") so that external devices and users can read and interpret data on local beacon 201. Interaction device 203 can connect to local beacon 201 either directly or via a home network, bypassing the Internet 202. This can be advantageous according to security, bandwidth, and reliability priorities.

Cloud resources can process data from local beacon 201 and present the data to interaction device 203. For example, a user can—using interaction device 203—logon to a website that is hosted by cloud resources 204 to view data regarding their plants 110. Cloud resources can facilitate the configuration of horticultural monitor 101 (including one or more sensor) and local beacon 201 as disclosed herein. Cloud resources 204 can push updates to horticultural monitor 101.

Third party APIs 205 can provide additional interaction or data. For example, a weather service can provide one or more of rainfall, sunlight, and cloud-cover data instead of or in addition to sensor data. Third party APIs can also be used to publish information; for example, cloud resources can publish a photo from camera 102, and plant health statistics to a social media account such as Pinterest, Facebook, Twitter, Instagram and so forth.

The plant monitoring system can include any combination of the horticultural monitor 101, the local beacon 201, the Internet 202 (i.e., a wide area network), the interface device 203, the cloud resources 204, and the third party APIs 205. Many of the features herein disclosed can be performed by one or multiple of the entities shown in FIG. 2.

Figure 3:
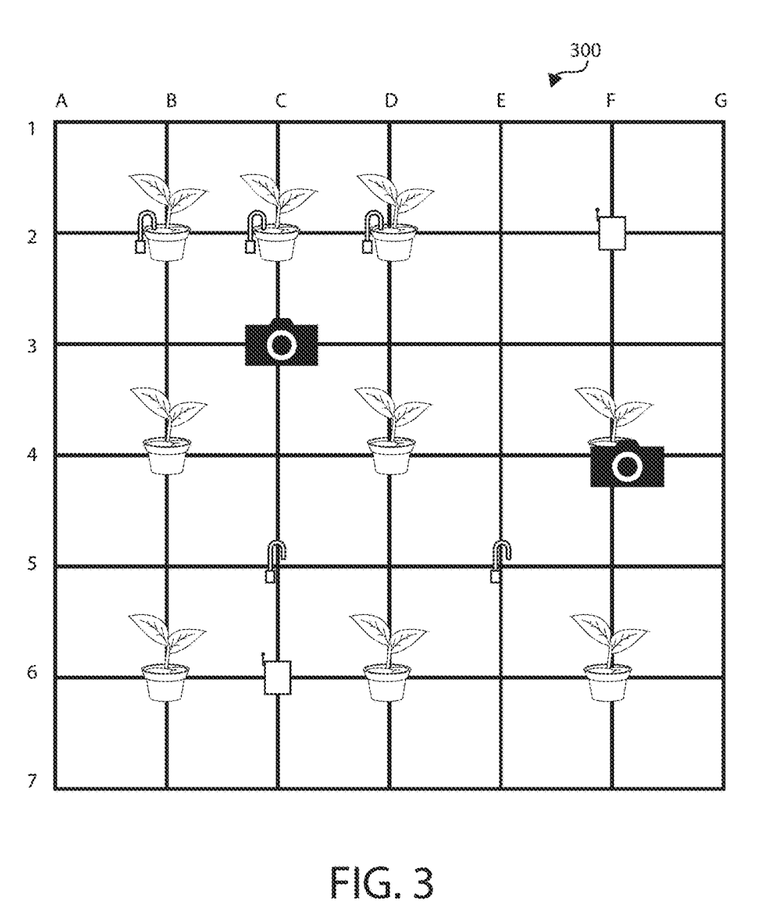
FIG. 3 shows an example garden layout according to some embodiments.

FIG. 3 shows an example garden layout 300 according to some embodiments. In example garden layout 300 various plants, sensors, and horticultural monitors can be placed in various locations. A sensor can be assigned and placed with an individual plant (e.g., at B2, the sensor is assigned to one plant) and in some embodiments a sensor can be placed such that it covers a region (e.g., plants at B4, D4, F4, B6, D6, and F6 can be assigned to have their data gathered from the sensors at C5 and E5). Multiple horticultural monitors can service a garden layout 300. For example, the horticultural monitor at C6 can service the sensors at C5 and E5 while the horticultural monitor at F2 can service the sensors at B2, C2, D2, C3, and F4. Multiple horticultural monitors can service the same sensor for redundancy and accuracy purposes.

Figure 4:
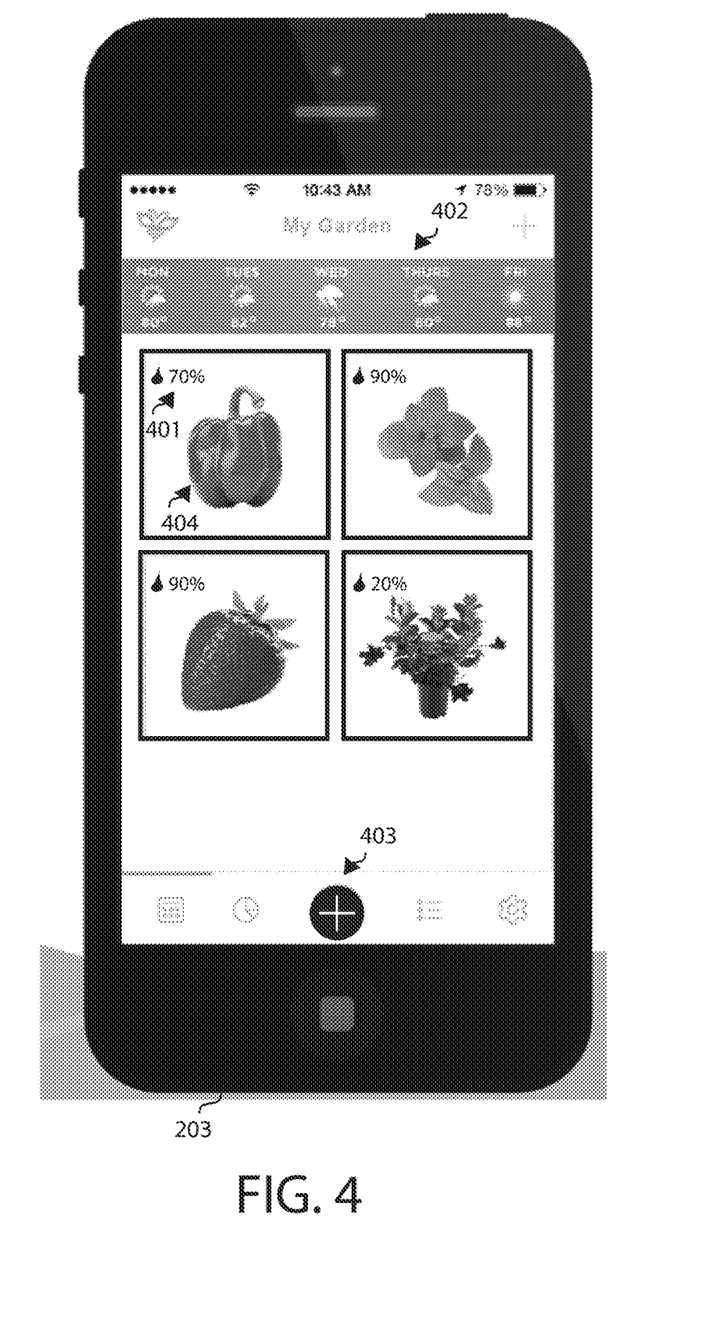
FIG. 4 shows an example interface on an interaction device according to some embodiments.

FIG. 4 shows example interface 402 on an interaction or mobile device 203. The interface 402 can be part of an application that is operable on a mobile device 203. Interface 402 can display various plants associated with the user. For example, it can show a picture 404 of the plant, portion of the plant, or a graphic such as a stock image to represent the plant. Relevant information 401 can also be shown. For example, in FIG. 4, relevant information 401 includes the moisture content of the soil, which in this example is 70%. Relevant information 401 can include current values and comparison with target values. For example, one plant may require four hours of sunlight per day and relevant information can depict the amount of sunlight the plant has currently received for the day, thus giving the viewer an idea of how much more that plant needs. The data can also include remaining daylight and expected sunlight for the remainder of the day, week or other time frame. Relevant information 401 can show a warning of a certain characteristic is outside of a certain range. For example, if the pH of the soil is greater or less than an optimal range for the specific plant. Relevant information 401 can provide the age of the plant and the time until maturity. For example, if the plant produces fruit, relevant information 401 can indicate how long until the fruit will be ready to harvest. A user can register a new plant to their monitored list by clicking add button 403.

A user can activate and control various parts of the system using an interface (e.g., example interface 402). For example, the user can control the camera (e.g., activate filters, move the camera, or take a picture or video), the user can instruct the horticultural monitor to perform tasks such as deliver nutrients (e.g., fertilizer, water, or compost), activate shades, or activate pest deterrent measures (e.g., an audio buzzer, pesticides, or a laser). Using the interface, a user can queue and schedule these activities. Similarly, the user can set conditional rules to activate these activities (e.g., when water saturation is a certain percentage, turn off irrigation). In this regard, various triggers can be established which, when one occurs, causes an action to be taken in the system.

A plant can be registered by a user scanning the plant (e.g., using a bar-code on the plant container or seed bag), taking a picture of the plant and using pattern recognition software to determine its species, or manually entering its information using an interface device 203. For example, using interface 402, a user can select add button 403 and interface 402 can present various plant species for selection. A user can select a picture of the plant; alternatively, a user can search for the plant using text. A user can describe the plant (e.g., how many leaves, the shape of the leaves, how the stem branches, or the size of the plant) and the interface 402 can suggest plants that fit the description.

In continuing the registration process, a user can associate sensors to the new plant. For example, a user can scan a sensor (e.g., a barcode on the sensor) or input a unique ID from the sensor. The system can automatically register a sensor (but not yet associate it with a plant) when the sensor is within range or when connected to a horticultural monitor. A user can then associate the sensor with the plant or indicate a location in a garden layout. The user can indicate a desired polling frequency of the sensor. For example, if the sensor is a camera, a user can indicate that the camera should take a new picture every hour or every day.

In continuing the registration process, a user can indicate the location of the new plant. For example, interface 402 can show a garden layout similar to example garden layout 300. The user can indicate where in the garden layout (e.g., grid location E3) that the plant is located. The system can automatically determine the location of the plant using, for example, a camera or any location based device. The user can indicate characteristics about the location of the plant. For example, the user can indicate that the plant is "inside, by the window." This can help with identification of the plant. A user can name the plant.

Figure 5:
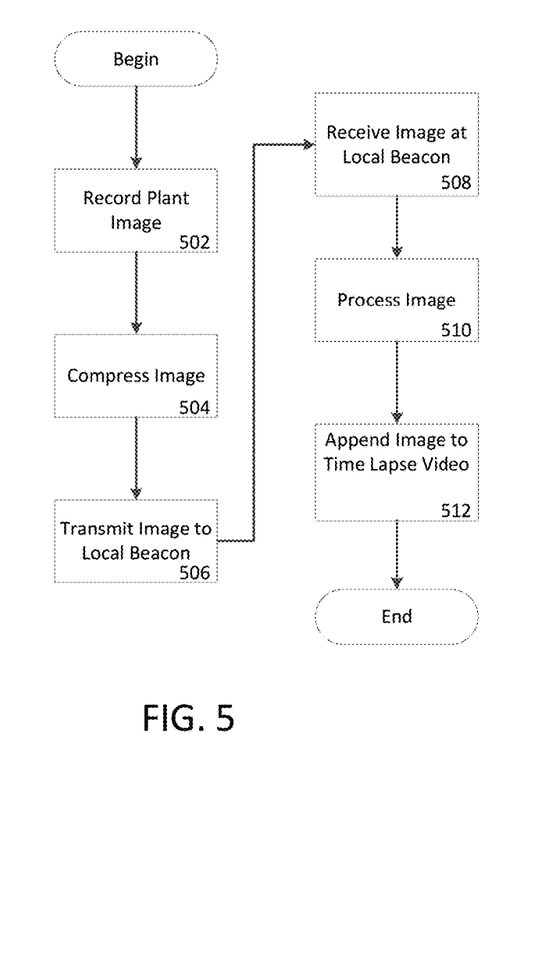
FIG. 5 shows an example method according to some embodiments.

FIG. 5 shows an example method according to some embodiments. Horticultural monitor can begin by recording a plant image (step 502) for example, by using a camera attached to the horticultural monitor. The horticultural monitor can then compress the image (step 504). This can include taking the raw data from the camera and converting it into a smaller size by decreasing its resolution. Compression algorithms such as JPEG can also be used to make the image a smaller size. In some embodiments, step 504 is performed by the camera itself. A system performing the method can continue by having the horticultural monitor transmit the image to the local beacon (step 506). The horticultural monitor can transmit the image immediately after it is captured; alternatively, the horticultural monitor can wait until a determined time before transmitting the image. For example, the horticultural monitor can hold images until a certain time when it can subsequently "dump" the images to the local beacon. The horticultural monitor (via a camera) can constantly be capturing images; alternatively, images can be captured only on command from local beacon (or other part of the plant monitoring system). The local beacon can then receive the image (step 508).

A system performing the method can continue by having the image processed (step 510). This can include correcting optical imperfections in the image (e.g., color aberration, lens distortions, dead pixels, etc.). Processing the image can further include identifying features in the image (as disclosed herein). A system performing the method can then include appending the image to a time lapse video (step 512).

Figure 6:
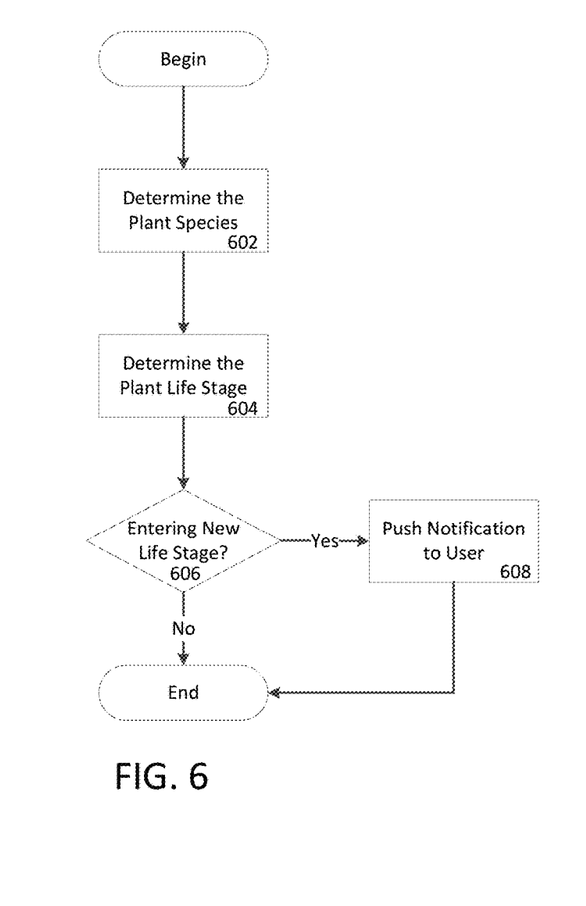
FIG. 6 shows an example method according to some embodiments.

FIG. 6 shows an example method according to some embodiments. This method can be practiced by a computing device or a computer that determines the plant species (step 602). In some embodiments, step 602 includes using a neural network and machine learning to associate an image of a plant with its species. Step 602 can include determining a confidence index for various plant species. For example it can calculate a 30% confidence index that the image represents one species and a 10% confidence index that the image represents another species.

Once an identification of the plant is achieved, the device or computer can continue by having the system determine the plant life stage (step 604). For example, the system can determine when the plant has sprouted, when it has reached maturity, when it has developed leaves, fruit, flowers, etc. Step 604 can use neural networks and machine learning to determine the plant life stage and assign confidence indices as such. The system can then determine if the plant is entering a new life stage (step 606), if it is then it can push a notification to the user (608). For example, a new life stage can include when the plant begins to grow fruit or its flowers begin to blossom. Step 608 can include sending a push notification to a user's personal interaction device (e.g., interaction device 203), based on the new life stage that is detected. Step 608 can include using a third party API 205 to publish a post on a third-party platform such as social media such as, for example, Facebook, Instagram, Pinterest, or Twitter.

Figure 7:
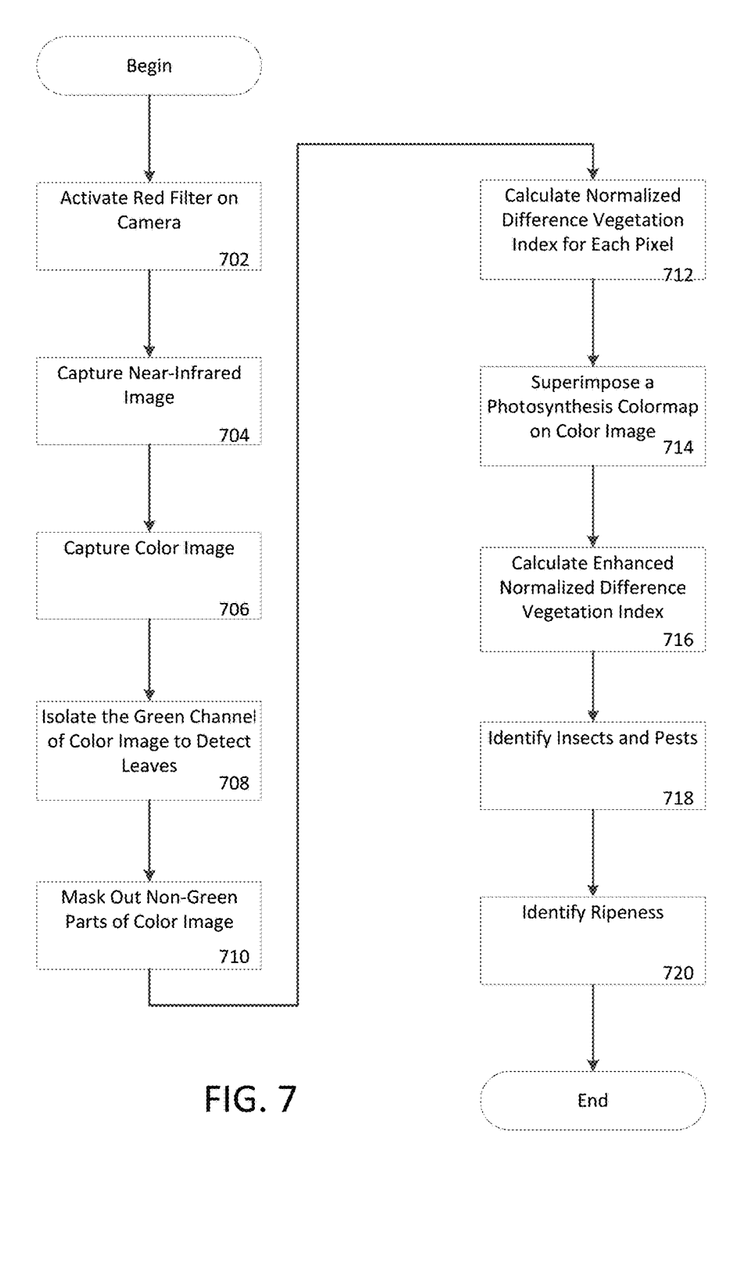
FIG. 7 shows an example method according to some embodiments.

FIG. 7 shows an example method according to some embodiments. The method involves a hardware component such as a computer or monitoring device activating a filter on the camera (step 702). The filter can be set for any spectra or color. Step 702 can include activating a motor that moves the filter physically over the camera lens or sensor. The camera can then capture an image (step 704). For example, if the filter is a red filter, the image captured would be a near-infrared image. In some embodiments, the camera includes a sensor that records red, green, and blue channels ("RGB camera"). With a filter blocking out most of the channel according to the filter's structure, the unfiltered light that is detected can be useful for various plant identification and diagnostic processes. A blue filter can be utilized to isolate a near-infrared image. The camera can be an infrared camera and can capture an infrared image. A system performing the method can continue by capturing a color (e.g., RGB) image (step 706). If a filter is covering the lens, the filter can be moved. Other physical filters can be applied such as a polarizing filter to enhance or diminish certain optical characteristics of an image.

A system performing the method can continue at step 708 by isolating the green channel of the color image to detect leaves. In some embodiments, this includes discarding the red and blue channel information. A system performing the method can continue and mask out non-green parts of the color image (step 710). For example, step 710 can include masking out where the green channel is below a certain threshold and/or where the hue of a pixel is not within a green range. In some embodiments, step 710 includes the computer applying pixel clustering and blur techniques so as to discard outlier pixels (e.g., those resulting from color noise).

A system performing the method can continue at step 712 by calculating the normalized difference vegetation index (NDVI) for each pixel. This index can be calculated using the formula NDVI=(R−B)/(R+B)+1 where "R" is red value of the pixel and "B" is blue value of the pixel. A system performing the method can then superimpose a photosynthesis colormap on the color image (step 714). The photosynthesis colormap can be created using the NDVI. A system performing the method can then calculate an enhanced normalized difference vegetation index (step 716). This can be done using the formula ((R+G)−2*B)/((R+G)+2*B)+1.

A system performing the method can then continue and identify insects and pests (step 718). For example, the system can identify actual pests (such as caterpillars) or the signs of pests (such as leaves being eaten). Step 718 can include identifying other organisms such as fungus or bacteria that might be on the plant, in the plant, or near the plant (e.g., in the soil, air, or neighboring structure). Step 718 can use neural networks and machine learning.

Similar to step 604, step 720 of the method can include identifying the ripeness of the plant. For example, it can make such determination based on the color or size of a fruit. Other factors may be used as well to determine ripeness, such as odor or time of the season. Step 720 can include comparing an image of the plant or portion of the plant with a database of images. For example, if a captured image is similar to a database image or collection of database images that are associated with an identified ripeness, the system performing step 720 can determine that the plant has the identified ripeness. This similarity can be determined based on a variety of qualities of the plant or part of the plant in the image. Examples of such a variety of qualities include size, texture, color, physical temperature, transparency, weight, reflectiveness, density of features (e.g., leaves, fruits, branches, or seeds), etc. The system can determine a confidence level for the determination of the ripeness. The system can determine a percentage ripeness if, e.g., part of the plant is ripe while other parts are not yet ripe. Step 720 can utilize computer vision (e.g., edge detection, feature identification, feature measuring—including color analysis, and object recognition) and machine learning to identify ripeness. Machine learning can include using a dataset of example images to determine the qualities (e.g., measurements) characteristic of defined labels assigned to the example images (e.g., "ripe" or "not ripe"). Such qualities can be utilized for the computer vision analysis.

Combining features herein disclosed can assist in the care and monitoring of plants in a personal or commercial setting. The plant monitoring system can detect the ripeness of a fruit and send an alert to a user with a photo of the plant and/or fruit. This can remind a less-attentive user to check on the fruit (e.g., if they are busy or out of town). The system can detect new plant life stages as herein disclosed and notify a user as herein disclosed. The system can utilize machine learning to recognize the plant species.

The plant monitoring system can educate a user about the care of their plant. For example, the system can indicate the optimal conditions (e.g., temperature, sunlight, humidity, water, etc.) for their plant and provide suggestions for achieving these optimal values. For example, it could provide tips for how to keep a plant warm during the winter or at night. The plant monitoring system can, using data from sensors and other sources, determine the types of plants that would flourish in the given environment. Videos and tutorials that are specific to a plant species or general to a genus or all gardening can be available via the interface device. The system can identify that the plant is sick or healthy and instruct the user on how to identify such symptoms (e.g., "note that the leaves have a texture like this image, this indicates that it may have ______ disease").

The sensors can include a depth sensor or depth sensor to provide special information. This spatial data in combination with pictures and other visual data can help create a three-dimensional model of the plant. The three-dimensional model can then be used for entertainment as well as technical purposes. For example, the three-dimensional model can be compared with structural data of similar plants to determine if it is healthy or within normal size expectations. The plant monitoring system can suggest that a user trim or prune certain parts of the plant. This can benefit from using virtual or augmented reality technology and the three-dimensional model. The system can save three-dimensional snapshots of the plant over time in order to create a time lapse of its growth and development.

The plant monitoring system can help a user to assess the needs of the soil for their plants. For example, using the sensors, it may determine that the pH, assay nitrogen, phosphorus, potassium, calcium, sulfur, magnesium, etc., levels are not optimal. The system can provide suggestions for fixing any deficiencies or problems. For example, it can suggest that the user place a type of compost or fertilizer in the soil. The soil can be monitored to determine if a plant infection has spread to the soil.

System can be used to count plants, leaves, fruits, amount of water per given period of time, etc. The system can also determine the volume of the fruits etc. These accountings can help a user can predict a harvest. In some embodiments, this is done by calculating the area or volume of plants or fruits and determining a total count based on average plant or fruit density.

An infrared sensor can determine the overall health of a plant. If the system detects poor health it can notify a user. The system can use environmental data (e.g., weather, sunlight, etc.) as well as sensor data to estimate the plant health and create a health index. The health index can be a value that describes the health of the plant. The system can warn a user of a future event or present condition (e.g., hot day, day of full sun, cold snap, high humidity, rain, migration of insects, etc.) and advise the user of precautionary measures to protect the plant. Data for future events can come from weather forecasts.

Chlorophyll can be measured over time using an infrared camera and times where the chlorophyll drops can be identified. An analysis of the chlorophyll levels and chlorophyll distribution in the leaves of a plant can be useful in disease detection. An image of one leaf can be compared with a historical image, an image of another leaf on the same plant, or a database of similar plants to determine if the leaf shows signs of disease. In order to isolate the chlorophyll emissions of weak near infrared light, a light (e.g., a blue light) can be shown on the leaf at night; this can prevent other ambient radiation from adversely affecting the image.

In some embodiments, the system includes a sensor that monitors the flow of water from the soil. For example, tubes underneath a garden can measure a sampling of water flow. This can be used to determine the overall irrigation loss volume. Irrigation loss volume combined with irrigation meters, rain meters, and other sensors can inform how much water has evaporated, how much is retained within the soil, and how much water has been used by the plant.

In some embodiments, the plant monitoring system not only monitors the plant but can actively participate in its development. For example, local resources can be connected to the horticultural monitor or local beacon to perform various functions, such as irrigation, shading, noise, heating, cooling, or nutrient systems. For example, the system can trigger irrigation to a plant or group of plants. The system can also emit a noise to scare off pests (e.g., deer or squirrels). A pet can wear a device that is easy to detect by the system so that when the pet is close to a plant, the system can emit a warning signal to scare the pet away. The system can engage a shade to block or obscure the sunlight getting to the plant. The system can activate a heater to keep the plant at an optimal temperature. The system can deliver fertilizer to the soil. The system can attempt to eliminate pests (e.g., using lasers or focused light). The system can activate a dehumidifier or humidifier to control humidity around the plant. The system can use a dehumidifier to capture water when the plant's stomata are closed and use that water for irrigation. The system can reflect sunlight to a plant. This can be especially useful if the plant is in a shaded, partially shaded, or seasonally shaded area.

The system can facilitate the breaking down of compost below the plants for heat generation. The system can then monitor and control the exothermic reactions.

The system disclosed herein can be utilized on fruits, vegetables, and flowers that have been extracted from the soil (e.g., within a grocery store). The system can monitor the moisture, ripeness, and freshness of these items and inform a worker to address any problems or remove inventory.

The plant monitoring system can be used to monitor plants etc. in underwater environments, such as within a fish tank or lake. Instead of measuring soil quality it can measure the water quality.

Figure 8A:
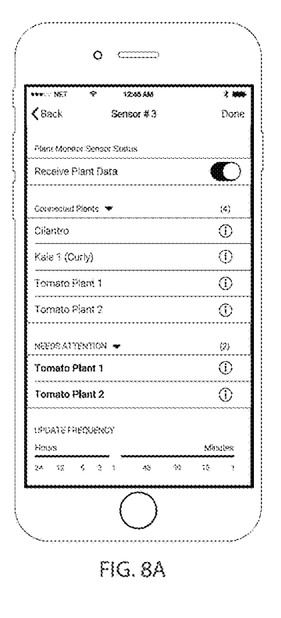
FIGS. 8A-8F show example interfaces on personal electronic devices according to various embodiments.

FIG. 8A shows an example interface on a personal electronic device (e.g., interaction device 203) according to various embodiments. For example, FIG. 8A shows various connected plants in an interface. The connected plants that need attention (e.g., more watering, sunlight, or other care) can be identified in a list of plants. The update frequency of each or all connected plants can be changed.

Figure 8B:
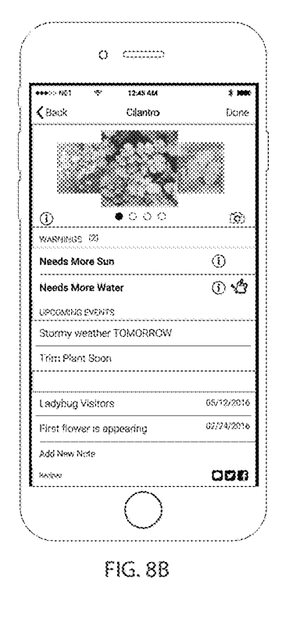

FIG. 8B shows an example interface on a personal electronic device (e.g., interaction device 203) according to various embodiments. For example, FIG. 8B shows an example connected plant display. After receiving a selection of a connected plant in FIG. 8A, the device can show the respective display of FIG. 8B). This display can show at least photos of the plant (including the option to take a photo), warnings for the plant (e.g., that the plant needs more sun or water), an option to remedy a problem identified in the warning (by, e.g., watering the plant), upcoming events (e.g., weather events or plant care events), and a history (including notes) of the plant.

Figure 8C:
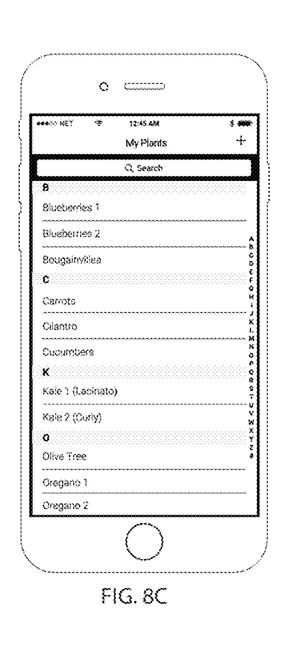

FIG. 8C shows an example interface on a personal electronic device (e.g., interaction device 203) according to various embodiments. For example, FIG. 8C shows an example technique for adding a plant as a connected plant.

Figure 8D:
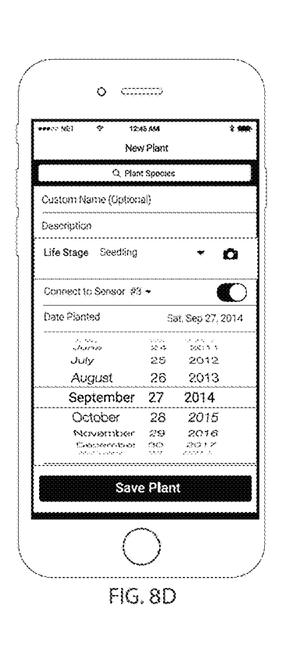

FIG. 8D shows an example interface on a personal electronic device (e.g., interaction device 203) according to various embodiments. For example, the device can show FIG. 8D after receiving a selection of a new plant as shown in FIG. 8C. The system can display and receive selections for a plant species, a custom name or avatar, a description, a life stage (e.g., seedling or sapling), a connected sensor (e.g., a sensor that monitors the plant), a date planted, etc.

Figure 8E:
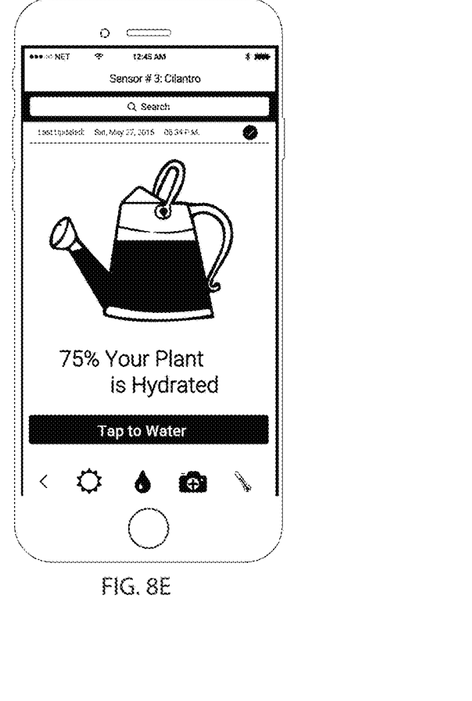

FIG. 8E shows an example interface on a personal electronic device (e.g., interaction device 203) according to various embodiments. For example, FIG. 8E shows an example plant hydration interface. The plant hydration interface can indicate the amount of water the plant has received or the soil saturation level. The plant hydration interface can indicate the last time the plant received water (e.g., through rain or irrigation). The plant hydration interface can receive input for watering the plant.

Figure 8F:
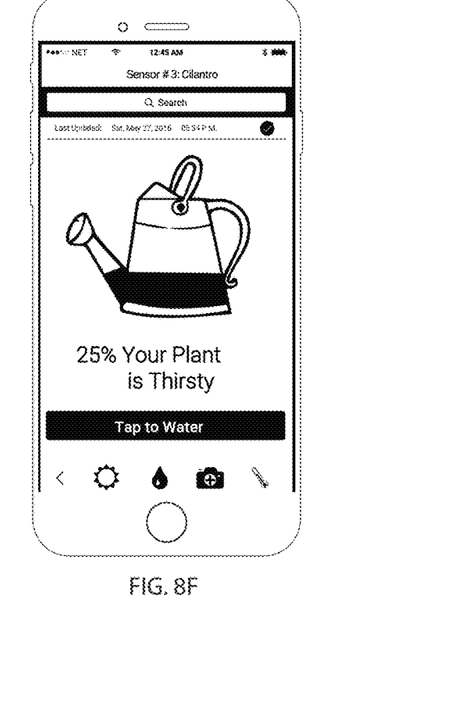

FIG. 8F shows an example interface on a personal electronic device (e.g., interaction device 203) according to various embodiments. For example, FIG. 8F shows an example plant hydration interface wherein the plant needs water.

Figure 9:
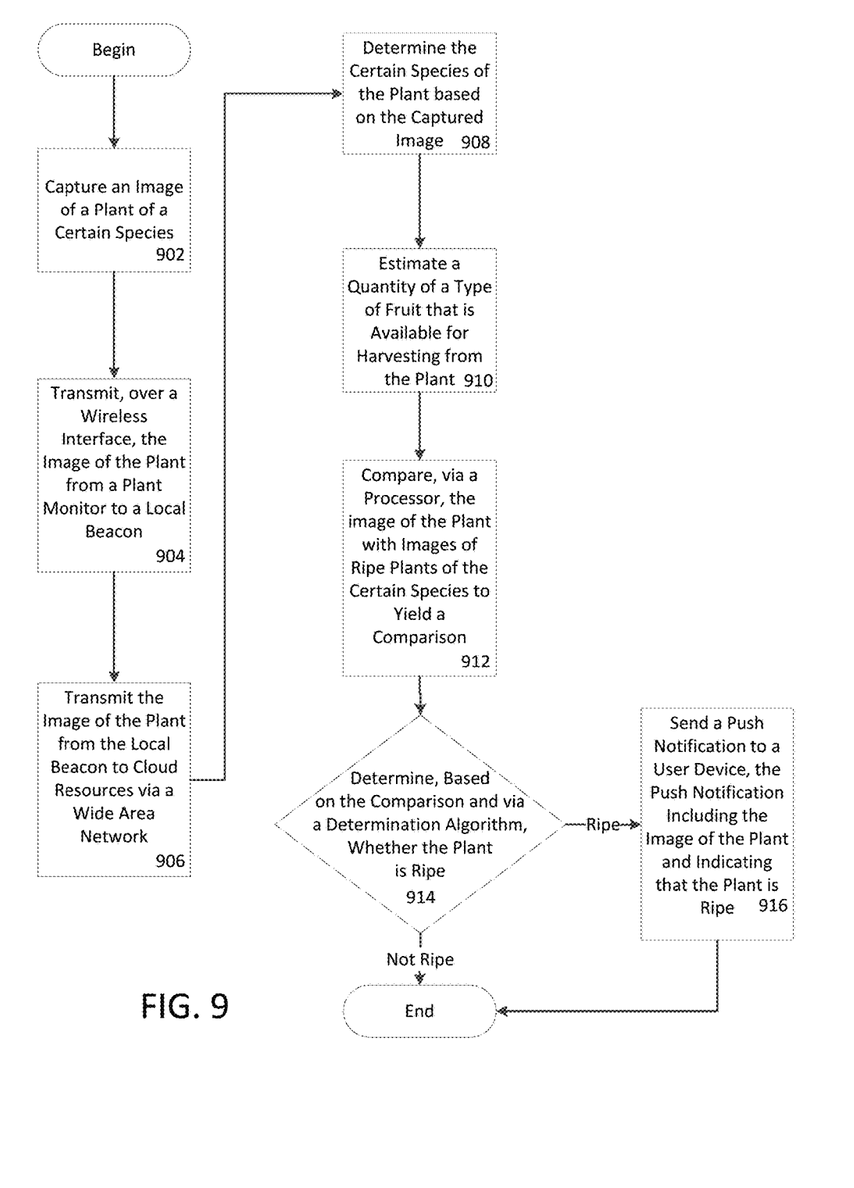
FIG. 9 shows an example method according to some embodiments.

FIG. 9 shows an example method that can be performed by system(s) disclosed herein. Such a system can begin and capture an image of a plant of a certain species (step 902). Step 902 can be accomplished with a sensor (e.g., a camera) as disclosed herein.

The system can continue performing the example method of FIG. 9 by transmitting, over a wireless interface, the image of the plant from a plant monitor to a local beacon (step 904). Step 904 can be an example of step 506 as discussed above.

The system can continue performing the example method of FIG. 9 by transmitting the image of the plant from the local beacon to cloud resources via a wide area network (step 906). Step 906 can be an example of step 508 as discussed above. The Internet is an example of a wide area network.

The system can continue performing the example method of FIG. 9 by determining the certain species of the plant based on the captured image (step 908). Step 908 can be an example of step 602 as discussed above. The system can identify the species in any number of ways. For example, the image can be compared graphically to images of known species to determine how similar the plants look to a known species. An algorithm can also evaluate the image for certain colors, shapes, and/or patterns to determine the species as well, without any direct reference to a picture of the known species. The algorithm can include data such as known temperatures, time of year, geographic location, and so forth, which data can affect the condition of the species. These and other contemplated approach can be used to determine the species of the plant.

The system can continue performing the example method of FIG. 9 by estimating a quantity of a type of fruit that is available for harvesting from the plant (step 910). This approach can of course include aggregating data from a number of different plants to provide an aggregated estimate of the quantity of fruit that is available for harvesting. The system can also present a graphical approach to notify individuals of which plants have fruit ready to harvest.

The system can continue performing the example method of FIG. 9 by comparing, via a processor, the image of the plant with images of ripe plants of the certain species to yield a comparison (step 912). Step 912 can be an example of step 720. This can be done in many different ways such as comparing an image to an image of a ripe plant, analyzing one or more of the color, texture, shape, weight, bend or condition of the plant (how bent over is a stalk holding the fruit), and so forth. Date, location, temperature, humidity, weather conditions, and/or other factors can be also applied to determine ripeness.

The system can continue performing the example method of FIG. 9 by determining, based on the comparison and via a determination algorithm, whether a plant is ripe (step 914). Step 914 can be an example of step 720. If the system determines in step 914 that the plant is ripe, it can continue and send a push notification to a user device, the push notification including the image of the plant and indicating that the plant is ripe (step 916). In some embodiments, the push notification does not include an image. The push notification can be similar that which is described in step 608. The push notification can include a link (e.g., a URL) to a website, application, etc. describing the plant. The push notification can include text identifying the plant. The push notification image can be formatted for display on a variety of devices (e.g., watch, phone, laptop or tablet). The push notification can include a selectable option (e.g., to water the plant, turn on a lamp, etc.). The push notification can provide a user with the option of selling the plant or fruit of the plant. The image can include an indication of ripeness (e.g., highlighting fruit that is ripe or a green check mark).

The push notification can be effective to indicate that the plant is ripe. For example, an indicator (e.g., a colored dot, text, a brief multi-media notification) can be presented in association with the plant to indicate its ripeness. Such an indicator can be a vibration, a graphic, a sound, etc. The indicator can be presented within a page for the associated plant or elsewhere (e.g., in a notification bar, dock, task bar, etc. of an operating system).

Figure 10A:
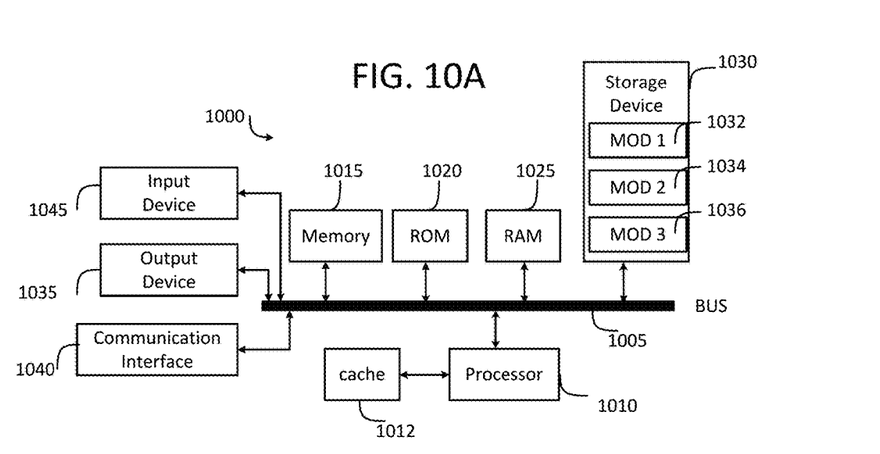
FIG. 10A shows an example possible system embodiment for implementing various embodiments of the present technology.
Figure 10B:
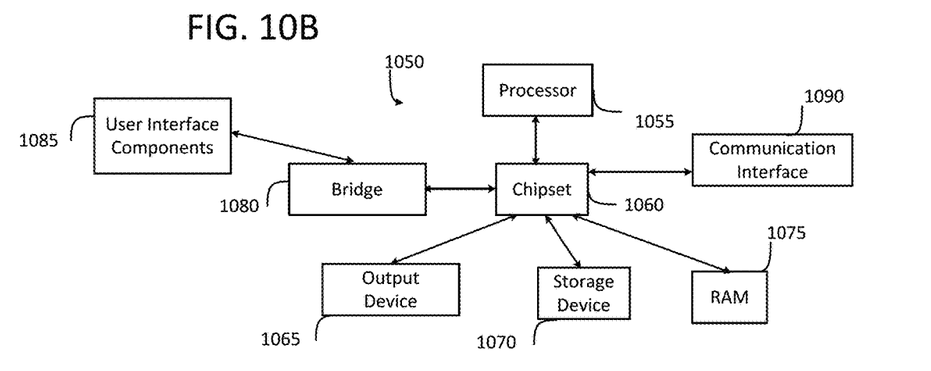
FIG. 10B shows an example possible system embodiment for implementing various embodiments of the present technology.

FIG. 10A and FIG. 10B show example possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Example system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks including devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   capturing raw data for a monitored plant via one or more sensors, the raw data comprising image data, the image data comprising a red-green-blue (RGB) image of the monitored plant;
   processing at least a portion of the raw data to yield processed data, the processed data comprising a photosynthesis colormap generated from the RGB image;
   comparing, via a processor, the raw data and the processed data for the monitored plant with data associated with other plants of a same species as the monitored plant and at one or more plant life stages to yield a comparison; and determining, based on the comparison and via a life stage determination algorithm, a one of the plant life stages associated with the monitored plant, the life stage determination algorithm implementing a machine learning process in a neural network with the processed data to determine the one of the plant life stages.

2. The computer-implemented method of claim 1, further comprising:

when the determining indicates that the one of the plant life stages for the monitored plant is a target plant life stage, sending a push notification to a user device, the push notification indicating that the plant has reached the target plant life stage.

3. The computer-implemented method of claim 1, further comprising:

when the determining indicates that the one of the plant life stages for the monitored plant is a target plant life stage, sending a push notification to a harvester device, the push notification comprising instructions for the harvester device to harvest at least a portion of the monitored plant.

4. The computer-implemented method of claim 1, further comprising determining a species of the monitored plant.

5. The computer-implemented method of claim 1, wherein the monitored plant is a fruit bearing plant, the method further comprising:

estimating, based on at least one of the raw data and the processed data for the monitored plant, a quantity of a type of fruit that is available for harvesting from the plant.

6. The computer-implemented method of claim 1, further comprising:

transmitting, over a wireless interface, the data for the monitored plant from a horticultural monitor to a local beacon; and transmitting the data for the monitored plant from the local beacon to cloud resources via a wide area network, wherein the processing and the comparing is performed by the cloud resources.

7. The computer-implemented method of claim 1, wherein at least one of the plant life stages comprises a plant life stage associated with a suboptimal health condition.

8. The computer-implemented method of claim 7, further comprising:

when the determining indicates that the one of the plant life stages for the monitored plant is associated with the suboptimal health condition, sending a push notification to a user device, the push notification indicating that a health of the monitored plant is suboptimal.

9. The computer-implemented method of claim 8, further comprising:

determining, using at least one of the raw data and the processed data and a health determination algorithm, a cause for the health of the monitor plant to be suboptimal.

10. The computer-implemented method of claim 9, further comprising:

based on the cause, determining a remedial measure for enhancing the health of the monitored plant that does not require human intervention; and implementing the remedial measure.

11. The computer-implemented method of claim 10, wherein the remedial measure comprises activating at least one of an irrigation system or a nutrient delivery system.

12. A system comprising:

a processing system comprising at least one processor and a computer-readable medium; and one or more horticultural monitors communicatively coupled to the processing system, each of the horticultural monitors comprising one or more sensors for monitoring at least one plant and configured for recording raw data from the sensors and transmitting the raw data to the processing system, the raw data comprising image data, the image data comprising a red-green-blue (RGB) image of the monitored plant, wherein the computer-readable medium comprises instructions for causing the at least one processor to perform steps comprising:

obtaining the raw data for the monitored plant;

processing at least a portion of the raw data to yield processed data, the processed data comprising a photosynthesis colormap generated from the RGB image;

comparing the raw data and the processed data for the monitored plant with data associated with other plants of a same species as the monitored plant and at one or more plant life stages to yield a comparison; and determining, based on the comparison and via a life stage determination algorithm, a one of the plant life stages associated with the monitored plant, the life stage determination algorithm implementing a machine learning process in a neural network with the processed data to determine the one of the plant life stages.

13. The system of claim 12, the steps further comprising:
when the determining indicates that the one of the plant life stages for the monitored plant is a target plant life stage, sending a push notification to a user device, the push notification indicating that the plant has reached the target plant life stage.

14. The system of claim 12, the steps further comprising:
when the determining indicates that the one of the plant life stages for the monitored plant is a target plant life stage, sending a push notification to a harvester device, the push notification comprising instructions for the harvester device to harvest at least a portion of the monitored plant.

15. The system of claim 12, the steps further comprising determining a species of the monitored plant.

16. The system of claim 12, wherein the monitored plant is a fruit bearing plant, the method further comprising:
estimating, based on at least one of the raw data and the processed data for the monitored plant, a quantity of a type of fruit that is available for harvesting from the plant.

17. The system of claim 12, wherein at least one of the plant life stages comprises a plant life stage associated with a suboptimal health condition.

18. The system of claim 12, further comprising:
when the determining indicates that the one of the plant life stages for the monitored plant is associated with the suboptimal health condition, sending a push notification to a user device, the push notification indicating that a health of the monitored plant is suboptimal.

19. The system of claim 18, further comprising:
determining, using at least one of the raw data and the processed data and a health determination algorithm, a cause for the health of the monitor plant to be suboptimal.

20. The system of claim 19, further comprising:
based on the cause, providing one or more instructions to the user device for enhancing the health of the monitored plant.

21. The system of claim 19, further comprising:
based on the cause, determining a remedial measure for enhancing the health of the monitored plant that does not require human intervention; and
implementing the remedial measure.

22. The system of claim 12, wherein the processing system comprises a local beacon and remote cloud resources, the local beacon being communicatively coupled to one or more horticultural monitors and one or more local resources, and the remote cloud resources being communicatively coupled to the local beacon, wherein the comparing and the determining is performed by the remote cloud resources.

23. The method of claim 1, wherein the processing comprises calculating values for pixels of the photosynthesis colormap based on normalized difference vegetation index (NDVI) for each pixel of the RGB image.

24. The method of claim 23, wherein the NDVI is calculated using the formula $NDVI=(R-B)/(R+B)+1$ where "R" is red value of the pixel of the RGB images and "B" is blue value of the pixel of the RGB image.

* * * * *